US012494336B2

(12) United States Patent
Yoneda

(10) Patent No.: US 12,494,336 B2
(45) Date of Patent: Dec. 9, 2025

(54) FUSE ELEMENT, FUSE DEVICE AND PROTECTION DEVICE

(71) Applicant: DEXERIALS CORPORATION, Tochigi (JP)

(72) Inventor: Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 565 days.

(21) Appl. No.: 17/596,329

(22) PCT Filed: Jun. 2, 2020

(86) PCT No.: PCT/JP2020/021764
§ 371 (c)(1),
(2) Date: Dec. 7, 2021

(87) PCT Pub. No.: WO2020/255699
PCT Pub. Date: Dec. 24, 2020

(65) Prior Publication Data
US 2022/0230830 A1 Jul. 21, 2022

(30) Foreign Application Priority Data
Jun. 19, 2019 (JP) ................................ 2019-113530

(51) Int. Cl.
*H01H 85/06* (2006.01)
*H01H 85/00* (2006.01)

(52) U.S. Cl.
CPC ........ *H01H 85/06* (2013.01); *H01H 85/0047* (2013.01)

(58) Field of Classification Search
CPC .................. H01H 85/0047; H01H 85/055-12
See application file for complete search history.

(56) References Cited

U.S. PATENT DOCUMENTS

2005/0040926 A1* 2/2005 Ely ........................ H01H 85/11 337/159
2010/0085141 A1* 4/2010 Knab .................. H01H 37/761 337/296

(Continued)

FOREIGN PATENT DOCUMENTS

CN 201315301 Y 9/2009
CN 107004538 A 8/2017

(Continued)

OTHER PUBLICATIONS

"Korean Application Serial No. 10-2021-7040438, Office Action dated Sep. 19, 2023", w English Translation, (Sep. 19, 2023), 13 pgs.

(Continued)

*Primary Examiner* — Jacob R Crum
(74) *Attorney, Agent, or Firm* — Schwegman Lundberg & Woessner, P.A.

(57) ABSTRACT

A fuse element (10) includes a low-melting-point metal layer (11), a high-melting-point metal layer (12) laminated on at least one surface of the low-melting-point metal layer (11), and an intermediate layer (13) disposed between the low-melting-point metal layer (11) and the high-melting-point metal layer (12), in which the high-melting-point metal layer (12) and the intermediate layer (13) are layers formed of a metal which is melted by a molten material of the low-melting-point metal layer (11), and the intermediate layer (13) has a higher ionization tendency than an ionization tendency of the high-melting-point metal layer (12).

8 Claims, 3 Drawing Sheets

(56) References Cited

U.S. PATENT DOCUMENTS

| | | | | |
|---|---|---|---|---|
| 2011/0057761 | A1 * | 3/2011 | Wang | H01H 85/0241 337/297 |
| 2012/0112871 | A1 * | 5/2012 | Chen | H01H 85/044 337/297 |
| 2013/0234822 | A1 * | 9/2013 | Aurich | B22D 41/015 337/416 |
| 2017/0278663 | A1 * | 9/2017 | Yoneda | H01H 85/12 |
| 2018/0025879 | A1 | 1/2018 | Ho et al. | |
| 2019/0228936 | A1 | 7/2019 | Yoneda et al. | |

FOREIGN PATENT DOCUMENTS

| | | | |
|---|---|---|---|
| CN | 107615440 | | 1/2018 |
| CN | 107735849 | A | 2/2018 |
| JP | 2001052593 | | 2/2001 |
| JP | 2015018740 | | 1/2015 |
| JP | 2016071973 | A | 5/2016 |
| JP | 2016095899 | A | 5/2016 |
| JP | 6249600 | B | 12/2017 |
| JP | 6420053 | B2 | 10/2018 |
| JP | 6423384 | | 10/2018 |
| JP | 6420053 | | 11/2018 |
| JP | 6577118 | | 9/2019 |
| KR | 20160097740 | | 8/2016 |
| KR | 20170013245 | | 2/2017 |
| KR | 20170042739 | A | 4/2017 |
| KR | 20170059004 | A | 5/2017 |
| KR | 20180072815 | | 6/2018 |
| KR | 20180130597 | | 12/2018 |
| TW | 201626418 | A | 7/2016 |
| TW | 201921399 | | 6/2019 |
| WO | 2015072122 | | 5/2015 |
| WO | WO-2016047385 | A1 | 3/2016 |
| WO | WO-2016076173 | A1 | 5/2016 |
| WO | 2016195108 | | 12/2016 |

OTHER PUBLICATIONS

"Chinese Application Serial No. 202080042402.1, Office Action dated Nov. 23, 2023", w English Translation, (Nov. 23, 2023), 21 pgs.

"Taiwanese Application Serial No. 109120359, Office Action dated Nov. 7, 2023", w English Translation, (Nov. 7, 2023).

"Japanese Application Serial No. 2019-113530, Office Action dated Jul. 12, 2022", w English Translation, (Jul. 12, 2022), 12 pgs.

"Korean Application Serial No. 10-2021-7012044, Office Action dated Jul. 22, 2022", w English Translation, (Jul. 22, 2022), 10 pgs.

"International Application Serial No. PCT/JP2020/021764, International Search Report dated Sep. 8, 2020", w/ English Translation, (Sep. 8, 2020), 5 pgs.

"International Application Serial No. PCT/JP2020/021764, Written Opinion dated Sep. 8, 2020", (Sep. 8, 2020), 4 pgs.

"Taiwanese Application No. 114112350, Office Action dated Oct. 17, 2025", w/ English Translation, (Oct. 17, 2025), 10 pgs.

* cited by examiner

FUSE ELEMENT, FUSE DEVICE AND PROTECTION DEVICE

PRIORITY APPLICATIONS

This application is a U.S. National Stage Filing under 35 U.S.C. § 371 from International Application No. PCT/JP2020/021764, filed on Jun. 2, 2020, and published as WO2020/255699 on Dec. 24, 2020, which claims the benefit of priority to Japanese Application No. 2019-113530, filed on Jun. 19, 2019; the benefit of priority of each of which is hereby claimed herein, and which applications and publication are hereby incorporated herein by reference in their entireties.

TECHNICAL FIELD

The present invention relates to a fuse element, and a fuse device and a protection device using the fuse element.

Priority is claimed on Japanese Patent Application No. 2019-113530 filed in Japan on Jun. 19, 2019, the content of which is incorporated herein by reference.

BACKGROUND ART

As a current cut-off device which cuts off a current path when an overcurrent which exceeds a rated current is applied to a circuit board, a fuse device is known that cuts off the current path using a fuse element which generates heat and fuse itself. As a fuse element for a fuse device, for example, Patent Document 1 describes a fuse element which includes a low-melting-point metal layer and a high-melting-point metal layer laminated on the low-melting-point metal layer, and having a configuration in which the low-melting-point metal layer is melted when a current exceeding a rated current is applied and a molten material thereof melts the high-melting-point metal layer to fuse the fuse element. In Patent Document 1, solder, tin, and a tin alloy are exemplified as a material of the low-melting-point metal layer, and silver, copper, and an alloy containing silver or copper as a main component are exemplified as a material of the high-melting-point metal layer.

Also, as a current cut-off device which cuts off a current path when an abnormality other than occurrence of an overcurrent occurs in a circuit board, a protection device using a heating element (heater) is known. The protection device is configured to cause a heating element to generate heat by applying a current to the heating element in the event of an abnormality other than occurrence of an overcurrent and use the generated heat to fuse the fuse element. As a fuse element (meltable conductor) which is used for the protection device using a heating element, for example, Patent Document 2 describes a fuse element which is formed of a laminate including a high-melting-point metal layer and a low-melting-point metal layer and having a configuration in which the low-melting-point metal layer is melted by heat generated by a heating element and then melts the high-melting-point metal layer to fuse the fuse element. In Patent Document 2, Pb-free solder, tin, and a tin alloy are exemplified as a material of the low-melting-point metal layer, and silver, copper, and an alloy containing silver or copper as a main component is exemplified as a material of the high-melting-point metal layer.

CITATION LIST

Patent Documents

Patent Document 1: Japanese Patent No. 6420053
Patent Document 2: Japanese Patent No. 6249600

SUMMARY OF INVENTION

Technical Problem

It is preferable that a fuse element is fused such that a low-melting-point metal layer is rapidly melted and a molten material thereof melts a high-melting-point metal layer in the event of an abnormality such as occurrence of an overcurrent. For this purpose, the low-melting-point metal layer and the high-melting-point metal layer are necessarily in close contact with each other. However, when a high-melting-point metal layer having a lower ionization tendency than a low-melting-point metal layer is formed on a surface of this low-melting-point metal layer by, for example, a plating method, a special pretreatment process is required to ensure adhesion at an interface between the low-melting-point metal layer and the high-melting-point metal layer, resulting in high costs.

The present invention has been made in view of the above circumstances, and an objective thereof is to provide a fuse element in which adhesion between a low-melting-point metal layer and a high-melting-point metal layer is high to allow rapid fusing in the event of an abnormality such as occurrence of an overcurrent and a production cost is low, and provides a fuse device and a protection device using the fuse element.

Solution to Problem

The present invention provides the following means to solve the above-described problems.

(1) A fuse element according to a first aspect of the present invention includes a low-melting-point metal layer, a high-melting-point metal layer laminated on at least one surface of the low-melting-point metal layer, and an intermediate layer disposed between the low-melting-point metal layer and the high-melting-point metal layer, in which the high-melting-point metal layer and the intermediate layer are layers formed of a metal which is melted by a molten material of the low-melting-point metal layer, and the intermediate layer has a higher ionization tendency than an ionization tendency of the high-melting-point metal layer.

(2) A fuse element according to a second aspect of the present invention includes a low-melting-point metal layer, a high-melting-point metal layer laminated on at least one surface of the low-melting-point metal layer, and an intermediate layer disposed between the low-melting-point metal layer and the high-melting-point metal layer, in which the high-melting-point metal layer and the intermediate layer are layers formed of a metal which is melted by a molten material of the low-melting-point metal layer, and the intermediate layer has a higher melting point than a melting point of the high-melting-point metal layer.

(3) In the aspect according to the above-described (1) or (2), the low-melting-point metal layer may be a layer formed of tin or a tin alloy which contains tin as a main component.

(4) In the aspect according to any one of the above-described (1) to (3), the high-melting-point metal layer may be a layer formed of silver or a silver alloy which contains silver as a main component.

(5) In the aspect according to any one of the above-described (1) to (4), the intermediate layer may be a layer formed of at least one type of a metal selected from the group consisting of copper, iron, and nickel, or an alloy which contains these metals as a main component.

(6) In the aspect according to any one of the above-described (1) to (5), the intermediate layer may have a lower ionization tendency than that of the low-melting-point metal layer.

(7) In the aspect according to any one of the above-described (1) to (6), a film thickness of the low-melting-point metal layer may be 30 μm or more, a film thickness of the high-melting-point metal layer may be 1 μm or more, and a film thickness of the intermediate layer may be within a range of 0.01 μm or more and 1 μm or less.

(8) A fuse device according to one aspect of the present invention includes an insulating substrate, and the fuse element according to any one of the above-described (1) to (7) disposed on a surface of the insulating substrate.

(9) A protection device according to one aspect of the present invention includes an insulating substrate, the fuse element according to any one of the above-described (1) to (7) disposed on a surface of the insulating substrate, and a heating element disposed on a surface of the insulating substrate and configured to heat the fuse element.

Advantageous Effects of Invention

According to the present invention, it is possible to provide a fuse element with high adhesion between a low-melting-point metal layer and a high-melting-point metal layer and low production cost, and a fuse device and a protection device using the fuse element.

DESCRIPTION OF EMBODIMENTS

Figure 1:
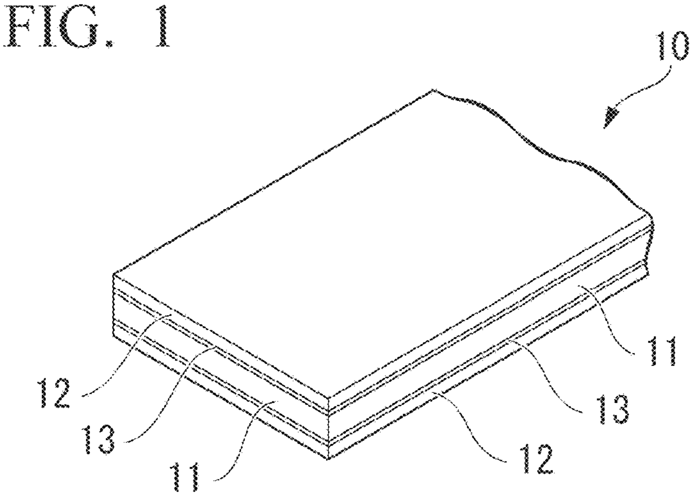
FIG. 1 is a schematic perspective view illustrating an example of a fuse element according to a first embodiment of the present invention.

Hereinafter, preferred examples of embodiments of a fuse element according to the present invention, and a fuse device and a protection device using the fuse element will be described in detail with reference to the drawings as appropriate. In the drawings used in the following description, there are cases in which characteristic portions are enlarged for convenience of illustration so that characteristics can be easily understood, and dimensional proportions or the like of respective constituent elements may be different from actual ones. Materials, dimensions, and the like illustrated in the following description are merely examples, and the present invention is not limited thereto and can be implemented with appropriate modifications within a range in which the effects of the present invention are achieved. Changes, omissions, additions, substitutions, and other modifications can be made to positions, numbers, ratios, types, sizes, shapes, or the like within a range not departing from the gist of the present invention. Unless there is a particular problem, preferable characteristics and conditions in the examples may be shared with each other.

Fuse Element (First Embodiment)

FIG. 1 is a schematic perspective view of a fuse element according to a first embodiment of the present invention.

As illustrated in FIG. 1, a fuse element 10 includes a low-melting-point metal layer 11, a high-melting-point metal layer 12 laminated on a surface of the low-melting-point metal layer 11, and an intermediate layer 13 disposed between the low-melting-point metal layer 11 and the high-melting-point metal layer 12. A shape of the fuse element 10 in a plan view and a cross-sectional shape thereof can be arbitrarily selected.

A melting point of the low-melting-point metal layer 11 is preferably equal to or lower than a heating temperature during reflow performed when a fuse device or a protection device is manufactured. When the reflow temperature is 240° C. to 260° C., a melting point of a material constituting the low-melting-point metal layer 11 is preferably in a range of 200° C. or higher and 235° C. or lower. The above-described melting point may be in a range of 200° C. or higher and 218° C. or lower or 218° C. or higher and 235° C. or lower as necessary.

A material of the low-melting-point metal layer 11 is preferably tin or a tin alloy containing tin as a main component. Containing "as a main component" means that the component is contained in an amount exceeding 50% by mass. A tin content of the tin alloy is preferably 40% by mass or more, and more preferably 60% by mass or more. The content mentioned above may also be 70% by mass or more or 80% by mass or more. An upper limit value of the content can be arbitrarily selected but may be, for example, 100% by mass or less, 99% by mass or less, or 97% by mass or less. As an example of the tin alloy, a Sn—Bi alloy, an In—Sn alloy, or a Sn—Ag—Cu alloy can be exemplified.

The high-melting-point metal layer 12 is a layer formed of a metal material that is melted by a molten material of the low-melting-point metal layer 11. When a material which constitutes the low-melting-point metal layer 11 is tin or a tin alloy, a material which constitutes the high-melting-point metal layer 12 is preferably silver or an alloy containing silver as a main component. A silver content of the silver alloy is preferably 40% by mass or more, and more preferably 60% by mass or more. The content described above may also be 70% by mass or more or 80% by mass or more.

An upper limit value of the content can be arbitrarily selected but may be, for example, 100% by mass or less, 99% by mass or less, or 97% by mass or less. As an example of the silver alloy, a silver-palladium alloy may be exemplified. Also, silver is a noble metal, has a low ionization tendency, basically barely oxidizes in the atmosphere, and is easily melted by a molten material of tin which constitutes the low-melting-point metal layer 11. Therefore, silver can be suitably used as a material of the high-melting-point metal layer 12 which is an outermost layer of the fuse element. Further, an ionization tendency of each of these metal is well known. Also, a higher ionization tendency means a greater likelihood of emitting electrons to produce cations, that is, it is a greater likelihood of oxidation. Also, an ionization tendency of each layer may mean an ionization tendency of a metal serving as a main component of the material which forms each layer.

It is preferable that a melting point of a material which constitutes the high-melting-point metal layer 12 is within a range of +100° C. or higher and +800° C. or lower with respect to the melting point of the low-melting-point metal layer 11. That is, the melting point of the high-melting-point metal layer 12 is preferably higher than that of the low-melting-point metal layer 11 by 100 to 800° C. The melting point of the high-melting-point metal layer 12 is preferably in a range of 300° C. or higher and 1000° C. or lower. The melting point of the high-melting-point metal layer 12 may be in a range of 300° C. or higher and 500° C. or lower, 500° C. or higher and 700° C. or lower, or 700° C. or higher and 1000° C. or lower as necessary.

The intermediate layer 13 is a layer formed of a metal material that is melted by the molten material of the low-melting-point metal layer 11. When the material which constitutes the low-melting-point metal layer 11 is tin or a tin alloy, a material which constitutes the intermediate laver 13 is preferably at least one type of a metal selected from the group consisting of copper, iron, and nickel, or a metal alloy containing the metal as a main component. An amount of copper, iron, and nickel in the metal alloy is preferably 40% by mass or more, and more preferably 60% by mass or more. The content described above may also be 70% by mass or more or 80% by mass or more. An upper limit value of the content can be arbitrarily selected but may be, for example, 100% by mass or less, 99% by mass or less, or 90% by mass or less. As an example of the copper alloy, phosphor bronze can be exemplified. As an example of the iron alloy, nickel iron can be exemplified. As an example of the nickel alloy, nickel-cobalt can be exemplified. Among metals that can be used for the intermediate layer 13, copper, iron, nickel, and alloys thereof have high rigidity and are preferable because the fuse element 10 using such a metal does not readily deform during reflow when the fuse device or the protection device is manufactured.

The intermediate layer 13 preferably has a higher ionization tendency than the high-melting-point metal layer 12. Due to the high ionization tendency of the intermediate layer 13, adhesion at an interface between the intermediate layer 13 and the high-melting-point metal layer 12 is improved when the high-melting-point metal layer 12 is formed by a plating method.

It is more preferable that the ionization tendency of the intermediate layer 13 be lower than that of the low-melting-point metal layer 11. That is, the ionization tendency of the intermediate layer 13 is more preferably between ionization tendencies of the low-melting-point metal layer 11 and the high-melting-point metal layer 12. When the ionization tendency of the intermediate layer 13 is between the ionization tendencies of the low-melting-point metal layer 11 and the high-melting-point metal layer 12, a difference in ionization tendency at the time of each plating can be reduced by interposing the intermediate layer 13 therebetween compared to a case in which the high-melting-point metal layer 12 is formed directly on the low-melting-point metal layer 11 by a plating method. As a result, it is possible to improve stability in plating, improve the quality, and reduce processing costs. Also, it is possible to obtain the intermediate layer 13 having a uniform film thickness and in which melting by the molten material of the low-melting-point metal layer 11 proceeds easily.

With regard to the intermediate layer 13, it is preferable that a melting point of the material constituting the layer be higher than the melting point of the high-melting-point metal layer 12. Thus if a thickness of the high-melting-point metal layer 12 is reduced, the fuse element 10 does not readily deform during reflow when the fuse device or the protection device is manufactured. The melting point of the intermediate layer 13 is preferably in a range of +50° C. or higher and +500° C. or lower with respect to the melting point of the high-melting-point metal layer 12. When the melting point of the intermediate layer 13 is too low, the above-described effects due to the intermediate layer 13 may not be obtained. On the other hand, when the melting point of the intermediate layer 13 is too high, there is a likelihood that it will become difficult for melting of the intermediate layer 13 by the molten material of the low-melting-point metal layer 11 to proceed, and a fusing speed of the fuse element 10 will decrease. The melting point of the intermediate layer 13 is preferably in a range of 950° C. or higher and 1600° C. or lower. The melting point of the intermediate layer 13 may be in a range of 950° C. or higher and 1200° C. or lower, 1200° C. or higher and 1400° C. or lower, or 1400° C. or higher and 1600° C. or lower as necessary.

In the event of an abnormality such as occurrence of an overcurrent, the low-melting-point metal layer 11 is melted, a produced molten material thereof melts the intermediate layer 13 and the high-melting-point metal layer 12, and thereby the fuse element 10 is fused. In the fuse element 10, the low-melting-point metal layer 11 is contained in an amount necessary for melting the intermediate layer 13 and the high-melting-point metal layer 12 to fuse the fuse element 10. The intermediate layer 13 and the high-melting-point metal layer 12 are contained in an amount necessary for maintaining a shape of the fuse element 10 during reflow when the fuse device or the protection device is manufactured.

From the above-described viewpoint, a film thickness of the low-melting-point metal layer 11 can be arbitrarily selected but is preferably 30 μm or more. The film thickness of the low-melting-point metal layer 11 may also be 60 μm or more, 100 μm or more, or 500 μm or more. An upper limit value of the film thickness of the low-melting-point metal layer 11 can be arbitrarily selected but may be, for example, 3000 μm or less. It may be 2000 μm or less, 1500 μm or less, or the like as necessary.

Also, a film thickness of the high-melting-point metal layer 12 can be arbitrarily selected but is preferably 1 μm or more. The film thickness of the high-melting-point metal layer 12 may be 5 μm or more or 10 μm or more. An upper limit value of the film thickness of the high-melting-point metal layer 11 can be arbitrarily selected but may be, for example, 100 μm or less or 50 μm or less.

Further, a film thickness of the intermediate layer 13 can be arbitrarily selected but is preferably in a range of 0.01 μm or more and 1 μm or less. It may be in a range of 0.01 μm or more and 0.1 μm or less, 0.05 μm or more and 0.5 μm or less, or 0.5 μm or more and 1.0 μm or less as necessary.

Also, a film thickness ratio of a total film thickness of the high-melting-point metal layer 12 and the intermediate layer 13 to the film thickness of the low-melting-point metal layer 11 (the former: the latter) can be arbitrarily selected but is preferably in a range of 1:2 to 1:100. It may be in a range of, for example, 1:2 to 1:10, 1:10 to 1:30, 1:30 to 1:100, or the like as necessary. If the total film thickness of the high-melting-point metal layer 12 and the intermediate layer 13 becomes too large, there is a likelihood that a time until the intermediate layer 13 and the high-melting-point metal layer 12 are melted will become long in the event of an abnormality, and the fusing speed of the fuse element 10 will decrease. On the other hand, when the film thickness of the low-melting-point metal layer 11 becomes too large, it may be difficult to maintain the shape of the fuse element 10 during reflow when the fuse device or a protection device is manufactured.

The fuse element 10 can be manufactured by, for example, using a plating method. Specifically, the fuse element 10 can be manufactured by preparing a metal foil as the low-melting-point metal layer 11, forming the intermediate layer 13 on a surface of the metal foil by a plating method, and then forming the high-melting-point metal layer 12 on a surface of the intermediate layer 13 by a plating method. When tin or a tin alloy is used as the low-melting-point metal layer 11, the low-melting-point metal layer 11 readily oxidizes, and a passive film may be formed on a surface thereof. In this case, it is preferable to use a method of electrolytic plating (strike plating method) in a short time by applying a high current when the intermediate layer 13 is formed.

The fuse element 10 illustrated in FIG. 1 has a configuration in which the intermediate layer 13 and the high-melting-point metal layer 12 are laminated on a surface of the low-melting-point metal layer 11, but a configuration of the fuse element is not limited thereto. Examples of other configurations of the fuse element 10 are illustrated in FIGS. 2 and 3.

Figure 2:
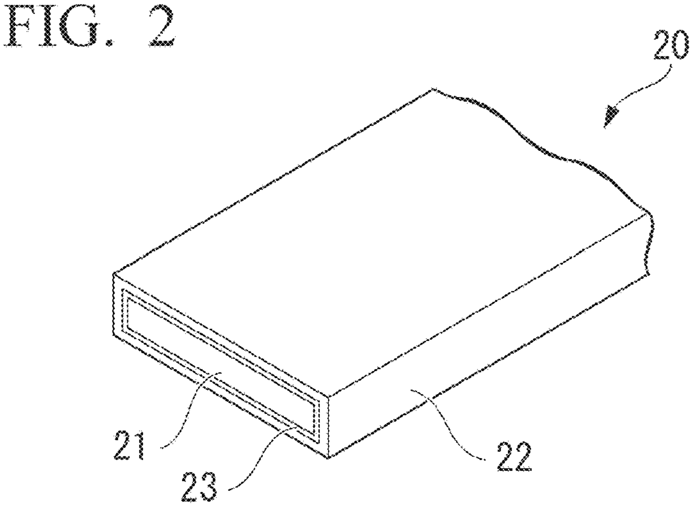
FIG. 2 is a schematic perspective view illustrating another example of the fuse element according to the first embodiment of the present invention.

FIG. 2 is a schematic perspective view illustrating another example of the fuse element according to the first embodiment of the present invention. A fuse element 20 illustrated in FIG. 2 includes a low-melting-point metal layer 21 having a rectangular cross section, a high-melting-point metal layer 22 laminated around the low-melting-point metal layer 21, and an intermediate layer 23 disposed between the low-melting-point metal layer 21 and the high-melting-point metal layer 22. In the fuse element 20, both a main surface and a side surface of the low-melting-point metal layer 21 are covered with the intermediate layer 23 and the high-melting-point metal layer 22. Therefore, rigidity of an outer shell formed of the high-melting-point metal layer 22 and the intermediate layer 23 is increased, and a shape of the fuse element 10 is easily maintained during reflow.

Figure 3:
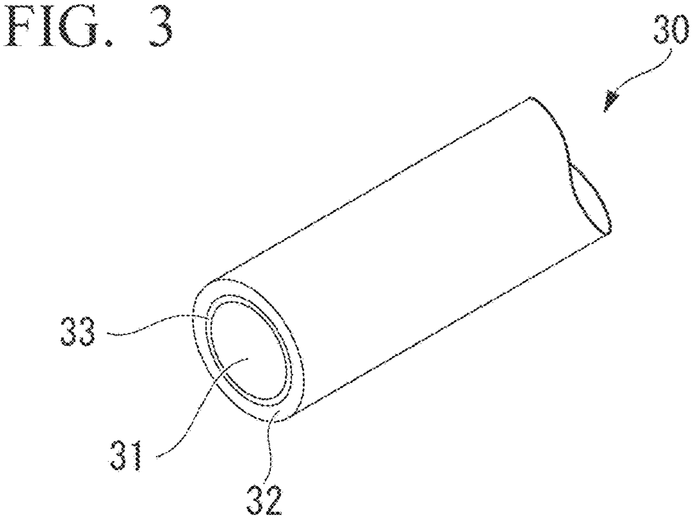
FIG. 3 is a schematic perspective view illustrating still another example of the fuse element according to the first embodiment of the present invention.

FIG. 3 is a schematic perspective view illustrating still another example of the fuse element according to the first embodiment of the present invention. A fuse element 30 illustrated in FIG. 3 includes a low-melting-point metal layer 31 having a circular cross section, a high-melting-point metal layer 32 laminated around the low-melting-point metal layer 31, and an intermediate layer 33 disposed between the low-melting-point metal layer 31 and the high-melting-point metal layer 32. In the fuse element 30, since a side surface of the low-melting-point metal layer 31 is concentrically covered with the intermediate layer 33 and the high-melting-point metal layer 32, the low-melting-point metal layer 31 barely oxidizes. Also, thicknesses of the intermediate layer 33 and the high-melting-point metal layer 32 are easily made uniform, and melting of the intermediate layer 33 and the high-melting-point metal layer 32 easily proceed uniformly. Therefore, a fusing speed of the fuse element 30 further increases.

In the fuse elements 10, 20, and 30 according to the first embodiment of the present invention having the above-described configuration, when ionization tendencies of the intermediate layers 13, 23, and 33 are higher than ionization tendencies of the high-melting-point metal layers 12, 22, and 32, the high-melting-point metal layers 12, 22, and 32 having excellent interfacial adhesion with the intermediate layers 13, 23, and 33 and high stability can be formed at low cost by using a plating method. Particularly, in the fuse elements 10, 20, and 30 in which the intermediate layers 13, 23, and 33 are formed by a strike plating method, interfacial adhesion between the low-melting-point metal layers 11, 21, and 31, the intermediate layers 13, 23, and 33, and the high-melting-point metal layer 12 and 22 is excellent, and therefore fusing can be made more rapidly in the event of an abnormality such as occurrence of an overcurrent. Also, in the fuse elements 10, 20, and 30 in which melting points of the intermediate layers 13, 23, and 33 are higher than melting points of the high-melting-point metal layers 12, 22 and 32, since adhesion of each layer at a high temperature is not easily decreased and each layer is not easily peeled off, fusing can be made more rapidly even when a temperature becomes high due to occurrence of an overcurrent or the like.

The fuse elements 10, 20, and 30 according to the first embodiment of the present invention may further include a layer made of a metal having a lower melting point than the intermediate layers 13, 23, and 33 and a higher melting point than the high-melting-point metal layers 12, 22, and 32, and that is melted by molten materials of the low-melting-point metal layers 11, 21, and 31 between the intermediate layers 13, 23, and 33 and the high-melting-point metal layers 12, 22, and 32. Also, an antioxidant layer may be provided on surfaces of the high-melting-point metal layers 12, 22, and 32.

Next, an embodiment of the fuse device and the protection device according to the present invention will be described by taking a case in which the fuse element 10 illustrated in FIG. 1 is used as a fuse element as an example.

Fuse Device (Second Embodiment)

Figure 4:
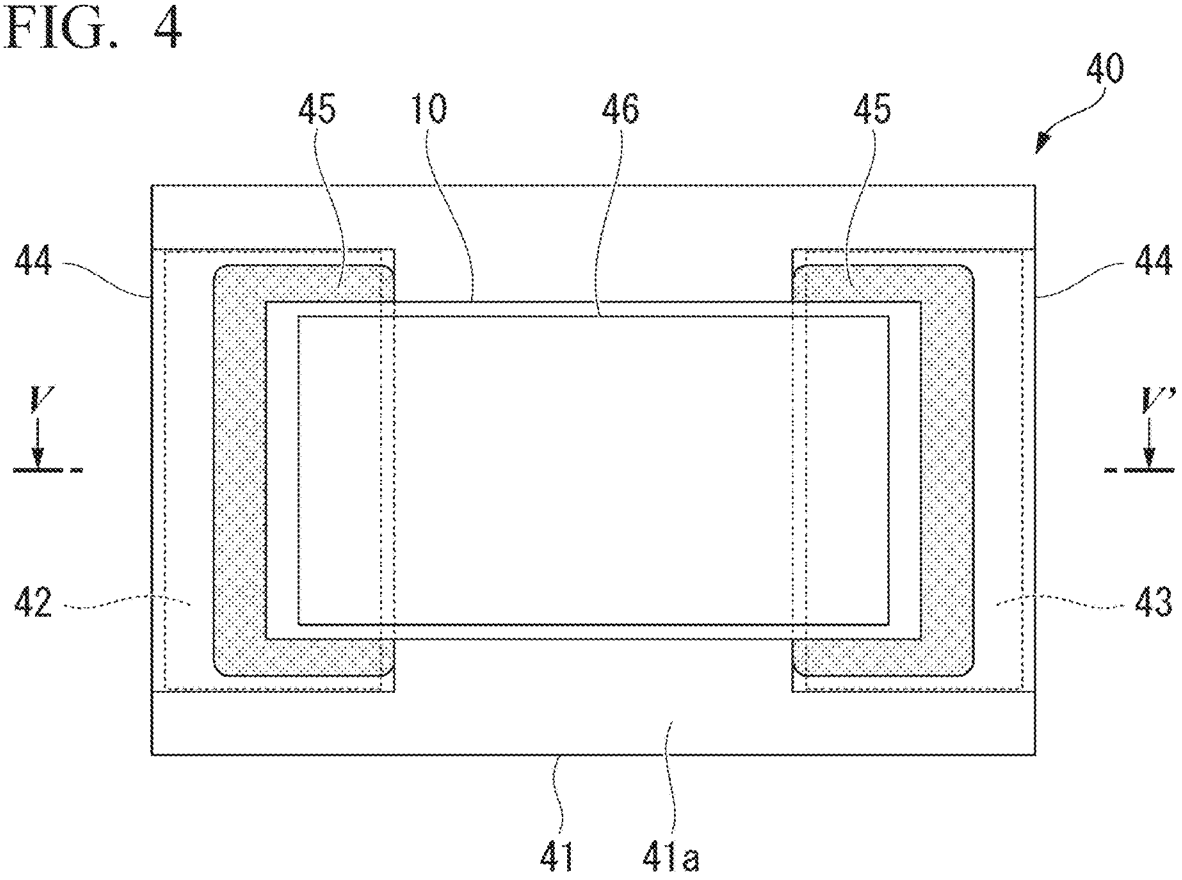
FIG. 4 is a schematic plan view illustrating an example of a fuse device according to a second embodiment of the present invention.
Figure 5:
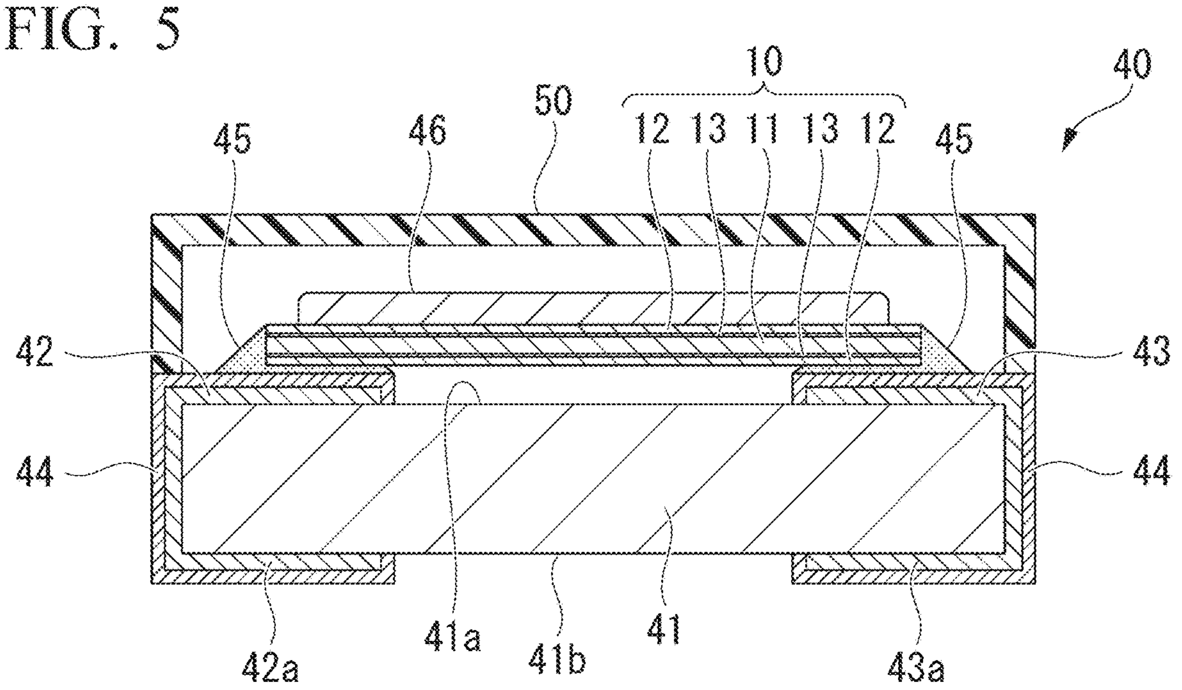
FIG. 5 is a cross-sectional view along line V-V' of FIG. 4.

FIG. 4 is a schematic plan view of a fuse device according to a second embodiment of the present invention. FIG. 5 is a cross-sectional view along line V-V' of FIG. 4. Further, FIG. 4 is in a state in which a cover member of the fuse device is removed.

As illustrated in FIGS. 4 and 5, a fuse device 40 includes an insulating substrate 41, a first electrode 42 and a second electrode 43 disposed on a surface 41*a* of the insulating substrate 41, and a fuse element 10 electrically connecting the first electrode 42 and the second electrode 43.

The insulating substrate 41 is not particularly limited as long as it has electrical insulating properties, and a known insulating substrate used as a circuit board such as a resin substrate, a ceramics substrate, or a composite substrate of a resin and a ceramic may be used. As an example of the resin substrate, an epoxy resin substrate, a phenolic resin substrate, or a polyimide substrate can be exemplified. As an example of the ceramic substrate, an alumina substrate, a glass ceramic substrate, a mullite substrate, or a zirconia substrate can be exemplified. As an example of the composite substrate, a glass epoxy substrate can be exemplified.

The first electrode 42 and the second electrode 43 are disposed at a pair of opposite end portions of the insulating substrate 41 facing each other. The first electrode 42 and the second electrode 43 are each formed by a conductive pattern such as silver wiring, copper wiring, or the like. Surfaces of the first electrode 42 and the second electrode 43 are each covered with an electrode protective layer 44 for suppressing change of properties in electrode characteristics which may be caused due to oxidation or the like. As a material which constitutes the electrode protective layer 44, for example, a Sn plating film, a Ni/Au plating film, a Ni/Pd plating film, a Ni/Pd/Au plating film, or the like can be used. Also, the first electrode 42 and the second electrode 43 are electrically connected to a first external connection electrode 42*a* and a second external connection electrode 43*a* formed on a back surface 41*b* of the insulating substrate 41 via castellation, respectively. Connections of the first electrode 42 and the second electrode 43 to the first external connection electrode 42*a* and the second external connection electrode 43*a* are not limited to castellation and may be performed by a through hole.

The fuse element 10 is electrically connected to the first electrode 42 and the second electrode 43 via a connecting material 45 such as solder.

A flux 46 is applied to a surface of the fuse element 10. When the flux 46 is applied, oxidation of the fuse element 10 is prevented, and wettability of the connecting material 45 when the fuse element 10 is connected to the first electrode 42 and the second electrode 43 via the connecting material 45 is improved. Also, when the flux 46 is applied, a molten metal adhering to the insulating substrate 41 due to arc discharge can be suppressed, and insulating properties after the fuse element 10 is fused can be improved.

As illustrated in FIG. 5, the fuse device 40 preferably includes a cover member 50 attached via an adhesive. When the cover member 50 is attached, the inside of the fuse device 40 can be protected and a molten material produced when the fuse element 10 is fused can be prevented from scattering. As a material of the cover member 50, various engineering plastics and ceramics can be used.

The fuse device 40 is mounted on a current path of a circuit board via the first external connection electrode 42*a* and the second external connection electrode 43*a*. While a rated current flows through the current path of the circuit board, the low-melting-point metal layer 11 of the fuse element 10 provided in the fuse device 40 does not melt. On the other hand, when an overcurrent which exceeds the rated current is applied to the current path of the circuit board, the low-melting-point metal layer 11 of the fuse element 10 generates heat and melts, a produced molten metal melts the intermediate layer 13 and the high-melting-point metal layer 12, and thereby the fuse element 10 is fused. Then, due to the fusing of the fuse element 10, the first electrode 42 and the second electrode 43 are disconnected, and the current path of the circuit board is cut off.

The fuse device 40 according to the second embodiment of the present invention having the above-described configuration uses the fuse element 10 according to the first embodiment of the present invention. Therefore, the fuse element 10 is rapidly fused in the event of occurrence of an overcurrent. Therefore, the current path of the circuit board can be cut off at an early stage.

Protection Device (Third Embodiment)

Figure 6:
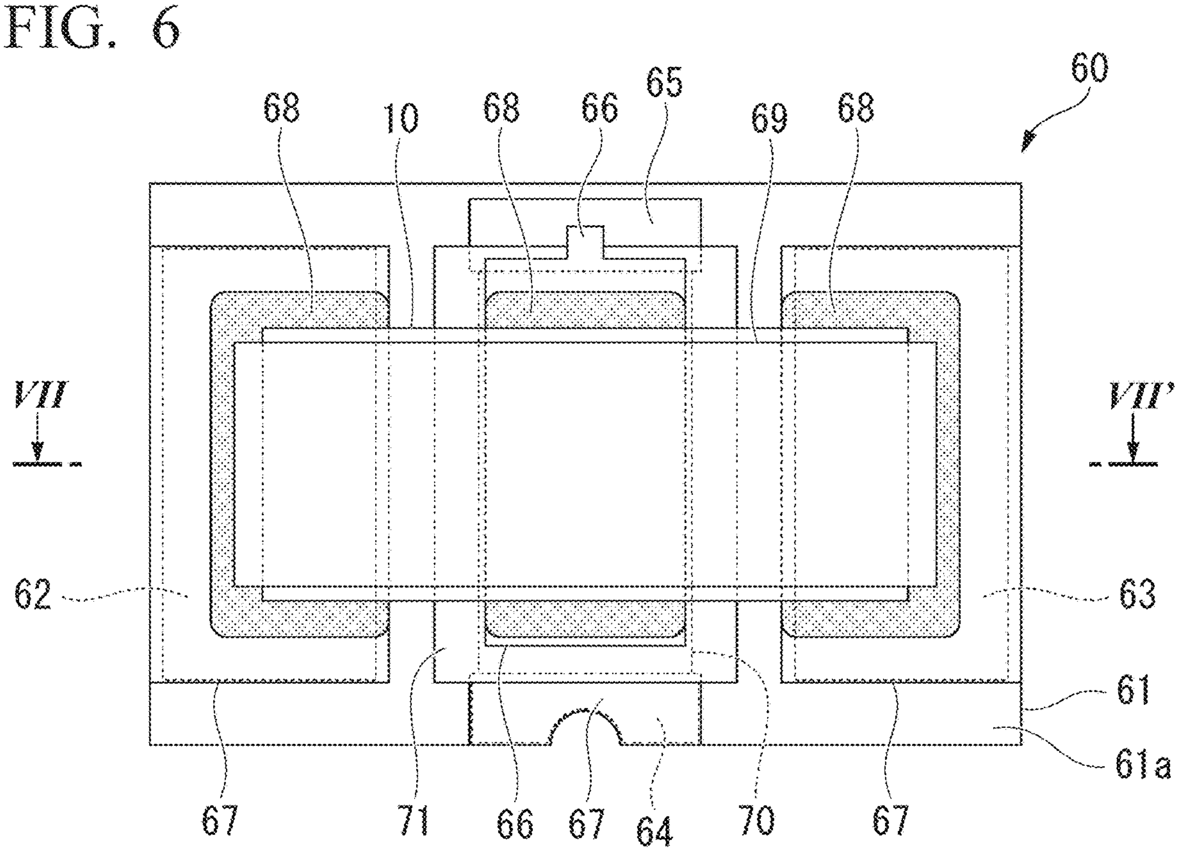
FIG. 6 is a schematic plan view illustrating an example of a protection device according to a third embodiment of the present invention.
Figure 7:
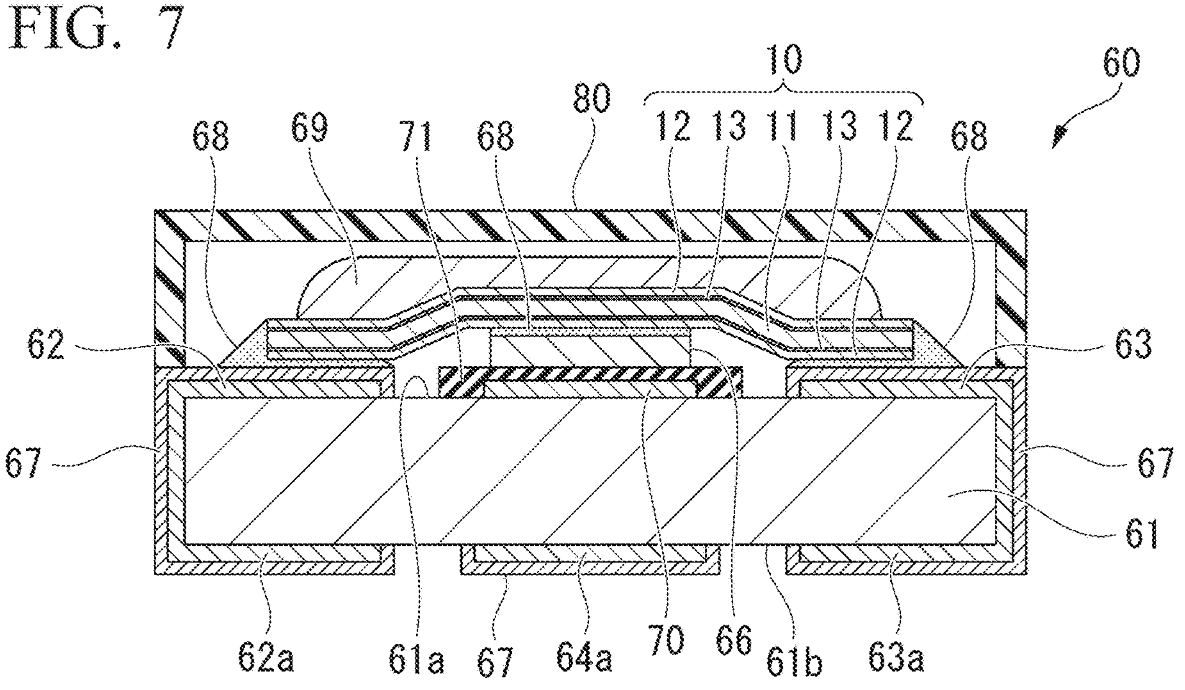
FIG. 7 is a cross-sectional view along line VII-VII' of FIG. 6.

FIG. 6 is a schematic plan view of a protection device according to a third embodiment of the present invention. FIG. 7 is a cross-sectional view along line VII-VII' of FIG. 6. Further, in FIG. 6, the protection device is in a state in which a cover member is removed.

As illustrated in FIGS. 6 and 7, a protection device 60 includes an insulating substrate 61, a first electrode 62 and a second electrode 63 disposed on a surface 61*a* of the insulating substrate 61, a heating element 70 disposed between the first electrode 62 and the second electrode 63, a first heating element electrode 64 and a second heating element electrode 65 connected to the heating element 70, a heating element lead-out electrode 66 connected to the second heating element electrode 65 and positioned at a place overlapping the heating element 70 in a plan view, and a fuse element 10 disposed on a surface of the heating element lead-out electrode 66.

The insulating substrate 61 is not particularly limited as long as it has electrical insulating properties. As the insulating substrate 61, a known insulating substrate used as a circuit board can be used as in the case of the fuse device 40 of the second embodiment. In the present example, the insulating substrate 61 is rectangular in a plan view but is not limited to the shape and may have an arbitrarily selected shape.

The first electrode 62 and the second electrode 63 are disposed at a pair of opposite end portions of the insulating substrate 61 facing each other. The first heating element electrode 64 and the second heating element electrode 65 are disposed at another pair of opposite end portions of the insulating substrate 61 facing each other. The first electrode 62, the second electrode 63, the first heating element electrode 64, the second heating element electrode 65, and the heating element lead-out electrode 66 are each formed by a conductive pattern such as silver wiring, copper wiring, or the like. Also, the first electrode 62, the second electrode 63, the first heating element electrode 64, the second heating element electrode 65, and the heating element lead-out electrode 66 are preferably covered with an electrode protective layer 67 for suppressing change of properties in electrode characteristics which may be caused due to oxidation or the like. A material of the electrode protective layer 67 is the same as that in the case of the fuse device 40 of the second embodiment. Further, the first electrode 62, the second electrode 63, and the first heating element electrode 64 are electrically connected to a first external connection electrode 62*a*, a second external connection electrode 63*a*, and a heating element feeding electrode 64*a* formed on a back surface 61*b* of the insulating substrate 61 via castellation, respectively. Further, respective connections of the first electrode 62, the second electrode 63, and the first heating element electrode 64 to the first external connection electrode 62*a*, the second external connection electrode 63*a*, and the heating element feeding electrode 64*a* are not limited to castellation and may be performed by a through hole.

The heating element 70 is formed of a high resistance conductive material that has relatively high resistance and generates heat due to energization. The heating element 70 is formed of, for example, nichrome, W, Mo, Ru, or the like or a material containing these. The heating element 70 can be preferably formed by a calcination method or the like after a paste form is prepared by mixing powder substances of an alloy, a composition or a compound which contains the above-described elements with a resin binder or the like, and the paste form is formed into a pattern on a surface of the insulating substrate 61 using a screen-printing technology.

The heating element 70 is covered with an insulating member 71. As a material of the insulating member 71, for example, glass can be used. The heating element lead-out electrode 66 is disposed to face the heating element 70 via the insulating member 71. With this disposition, the heating element 70 is superposed on the fuse element 10 via the insulating member 71 and the heating element lead-out electrode 66. With such a superposed structure, heat generated by the heating element 70 can be efficiently transferred to the fuse element 10 in a narrow range.

Both ends of the fuse element 10 are electrically connected to the first electrode 62 and the second electrode 63, and a central portion thereof is connected to the heating element lead-out electrode 66. The fuse element 10 is electrically connected to the first electrode 62, the second electrode 63, and the heating element lead-out electrode 66 via a connecting material 68 such as solder. With such a configuration, in the protection device 60, a first energization path is formed through the heating element feeding electrode 64*a*, the first heating element electrode 64, the heating element 70, the second heating element electrode 65, the heating element lead-out electrode 66, and the fuse element 10, and a second energization path is formed through the first external connection electrode 62*a*, the first electrode 62, the fuse element 10, the second electrode 63, and the second external connection electrode 63*a*. Also, a flux 69 is applied to a surface of the fuse element 10.

As illustrated in FIG. 7, in the protection device 60, a cover member 80 is preferably attached via an adhesive. A material of the cover member 80 is the same as that of the fuse device 40 of the second embodiment.

The protection device 60 is mounted on a current path of a circuit board via the first external connection electrode 62*a*, the second external connection electrode 63*a*, and the heating element feeding electrode 64*a*. Thereby, the fuse element 10 of the protection device 60 is connected in series on a current path of an external circuit board via the first external connection electrode 62*a* and the second external connection electrode 63*a*. The heating element 70 is connected to a current control device provided on the circuit board via the heating element feeding electrode 64*a*.

The protection device 60 is configured such that, when an abnormality occurs in the circuit board, the heating element 70 is energized via the heating element feeding electrode 64*a* by the current control device provided on the circuit board. This energization causes the heating element 70 to generate heat. Then, the heat is transferred to the fuse element 10 via the insulating member 71 and the heating element lead-out electrode 66. Due to the heat, the low-melting-point metal layer 11 of the fuse element 10 is melted, and a produced molten material melts the intermediate layer 13 and the high-melting-point metal layer 12. As a result, the fuse element 10 is fused. Then, due to the fusing of the fuse element 10, the first electrode 62 and the second electrode 63 are disconnected, and the current path of the circuit board is cut off.

The protection device 60 according to the third embodiment of the present invention having the above-described configuration uses the fuse element 10 according to the first embodiment of the present invention. As a result, the fuse element 10 is rapidly fused in the event of an abnormality. Therefore, the current path of the circuit board can be cut off at an early stage.

INDUSTRIAL APPLICABILITY

A fuse element with high adhesion between a low-melting-point metal layer and a high-melting-point metal layer and low production cost, and a fuse device and a protection device using the fuse element are provided.

REFERENCE SIGNS LIST

10, 20, 30 Fuse element
11, 21, 31 Low-melting-point metal layer
12, 22, 32 High-melting-point metal layer
13, 23, 33 Intermediate layer
40 Fuse device
41 Insulating substrate
41*a* Surface
41*b* Back surface
42 First electrode
42*a* First external connection electrode
43 Second electrode
43*a* Second external connection electrode
44. Electrode protective layer
45 Connecting material
46 Flux
50 Cover member
60 Protection device
61 Insulating substrate
61*a* Surface
61*b* Back surface
62 First electrode
62*a* First external connection electrode
63 Second electrode
63*a* Second external connection electrode
64 First heating element electrode
64*a* Heating element feeding electrode
65 Second heating element electrode
66 Heating element lead-out electrode
67 Electrode protective layer
68 Connecting material
69 Flux
70 Heating element
71 Insulating member
80 Cover member

The invention claimed is:

1. A fuse element comprising:

a low-melting-point metal layer;

a high-melting-point metal layer laminated around the low-melting-point metal layer; and an intermediate layer disposed between the low-melting-point metal layer and the high-melting-point metal layer, wherein the high-melting-point metal layer and the intermediate layer are layers formed of a metal which is melted by a molten material of the low-melting-point metal layer, wherein the low-melting-point metal layer is formed of tin or a tin alloy, wherein a melting point of a material constituting the low-melting-point metal layer is 200° C. or higher and 235° C. or lower, wherein the intermediate layer is formed of copper, or an alloy of copper, wherein a melting point of a material constituting the intermediate layer is 950° C. or higher and 1600° C. or lower, wherein the high-melting-point metal layer is formed of silver or a silver alloy, wherein a melting point of a material constituting the high-melting-point metal layer is 300° C. or higher and 1000° C. or lower, wherein the intermediate layer has a higher ionization tendency than an ionization tendency of the high-melting-point metal layer, wherein the intermediate layer has a lower ionization tendency than that of the low-melting-point metal layer, wherein the high-melting-point metal layer and the intermediate layer are layers formed by a plating method, wherein the intermediate layer is formed by a strike plating method, wherein the low-melting-point metal layer is covered with an outer shell which is formed of the high-melting-point metal layer and the intermediate layer, a film thickness of the low-melting-point metal layer is 30 μm or more, a film thickness of the high-melting-point metal layer is 1 μm or more, a film thickness of the intermediate layer is within a range of 0.01 μm or more and 1 μm or less, wherein the low-melting-point metal layer is melted when an overcurrent occurs, and a molten material of the low-melting-point metal layer melts the high-melting-point metal layer and the intermediate layer to fuse the fuse element, wherein reflow of the fuse element is performed when a fuse device or a protection device which include the fuse element is manufactured, wherein the melting point of a material constituting the low-melting-point metal layer is lower than a reflow temperature of the reflow, and wherein a rigidity of the outer shell maintains shape of the fuse element which has the laminated layers, when heating is performed for the reflow and the low-melting-point metal layer is melted by the heating.

2. A fuse device comprising:

an insulating substrate; and the fuse element according to claim 1, wherein the fuse element is disposed on a surface of the insulating substrate.

3. A protection device comprising:

an insulating substrate;

the fuse element according to claim 1, wherein the fuse element is disposed on a surface of the insulating substrate; and a heating element disposed on a surface of the insulating substrate and configured to heat the fuse element.

4. The fuse element according to claim 1, wherein a melting point of a material constituting the high-melting-point metal layer is higher than the melting point of the material constituting the low-melting-point metal layer by 100 to 800° C., wherein a melting point of a material constituting the intermediate layer is higher than the melting point of the material constituting the high-melting-point metal layer by 50 to 500° C., and wherein a film thickness ratio of a total film thickness of the high-melting-point metal layer and the intermediate layer to a film thickness of the low-melting-point metal layer is in a range of 1:2 to 1:100.

5. The fuse element according to claim 1, wherein the low-melting-point metal layer is formed of tin, a Sn—Bi alloy, an In—Sn alloy, or a Sn—Ag—Cu alloy, wherein the high-melting-point metal layer is formed of silver or a silver-palladium alloy, wherein the intermediate layer is formed, by a strike plating method, of copper, or phosphor bronze, wherein a melting point of a material constituting the intermediate layer is 950° C. or higher and 1600° C. or lower, wherein a film thickness ratio of a total film thickness of the high-melting-point metal layer and the intermediate layer to a film thickness of the low-melting-point metal layer is in a range of 1:2 to 1:100.

6. A fuse element comprising:

a low-melting-point metal layer;

a high-melting-point metal layer laminated around the low-melting-point metal layer; and an intermediate layer disposed between the low-melting-point metal layer and the high-melting-point metal layer, wherein the high-melting-point metal layer and the intermediate layer are layers formed of a metal which is melted by a molten material of the low-melting-point metal layer, wherein the low-melting-point metal layer is formed of tin or a tin alloy, wherein a melting point of a material constituting the low-melting-point metal layer is 200° C. or higher and 235° C. or lower, wherein the intermediate layer is formed of copper or an alloy copper, wherein a melting point of a material constituting the intermediate layer is 950° C. or higher and 1600° C. or lower, wherein the high-melting-point metal layer is formed of silver or a silver alloy, wherein a melting point of a material constituting the high-melting-point metal layer is 300° C. or higher and 1000° C. or lower, wherein the intermediate layer has a higher ionization tendency than an ionization tendency of the high-melting-point metal layer, the intermediate layer has a lower ionization tendency than that of the low-melting-point metal layer, wherein the high-melting-point metal layer and the intermediate layer are layers formed by a plating method, wherein the intermediate layer is formed by a strike plating method, wherein the low-melting-point metal layer is covered with an outer shell which is formed of the high-melting-point metal layer and the intermediate layer, wherein a film thickness of the low-melting-point metal layer is 30 μm or more, wherein a film thickness of the high-melting-point metal layer is 1 μm or more, wherein a film thickness of the intermediate layer is within a range of 0.01 μm or more and 1 μm or less, wherein the intermediate layer has a higher melting point than a melting point of the high-melting-point metal layer, and wherein at least one of the low-melting-point metal layer, the intermediate layer, and the high-melting-point metal layer is made of alloy.

7. The fuse element according to claim 1, wherein a cross section of the low-melting-point metal layer is rectangular, and the intermediate layer and the high-melting-point metal layer cover a periphery of the low-melting-point metal layer.

8. The fuse element according to claim 1, wherein a cross section of the low-melting-point metal layer is circular, and the intermediate layer and the high-melting-point metal layer cover a periphery of the low-melting-point metal layer.

* * * * *